(12) United States Patent
Lee (10) Patent No.: US 9,034,188 B2
(45) Date of Patent: May 19, 2015

(54) CLEANING STRUCTURE FOR FLOATING OIL AND SUBSTANCE ON WATER SURFACE

(71) Applicant: Pei-Yuan Lee, Changhua County (TW)

(72) Inventor: Pei-Yuan Lee, Changhua County (TW)

( * ) Notice: Subject to any disclaimer, the term of this patent is extended or adjusted under 35 U.S.C. 154(b) by 206 days.

(21) Appl. No.: 13/747,494

(22) Filed: Jan. 23, 2013

(65) Prior Publication Data

US 2014/0202945 A1    Jul. 24, 2014

(51) Int. Cl.
E02B 15/10 (2006.01)

(52) U.S. Cl.
CPC ..................... E02B 15/101 (2013.01)

(58) Field of Classification Search
CPC .......... E02B 15/101; C02F 1/285; C02F 1/40; C02F 2101/32; C02F 2103/007
USPC ............. 210/242.4, 496, 502.1, 924
See application file for complete search history.

(56) References Cited

U.S. PATENT DOCUMENTS

| | | | | |
|---|---|---|---|---|
| 3,520,762 A | * | 7/1970 | Yasunori et al. | 428/91 |
| 3,668,118 A | * | 6/1972 | Rhodes | 210/671 |
| 3,748,682 A | * | 7/1973 | Rhodes | 15/229.1 |
| 4,332,854 A | * | 6/1982 | Parker | 428/377 |
| 5,248,415 A | * | 9/1993 | Masuda et al. | 210/154 |
| 5,252,215 A | * | 10/1993 | McFarlane et al. | 210/691 |
| 5,423,985 A | * | 6/1995 | Addeo et al. | 210/242.4 |
| 8,828,236 B2 | * | 9/2014 | Stewart et al. | 210/671 |

FOREIGN PATENT DOCUMENTS

JP        2002172390 A  *  6/2002  ............. E02B 15/10

* cited by examiner

*Primary Examiner* — Matthew O Savage
(74) *Attorney, Agent, or Firm* — Che-Yang Chen; Law Office of Michael Chen (57) ABSTRACT

A cleaning structure for floating oil and substance on water surface provided by the present invention comprises at least one cleaning ball and a threading rope. The cleaning ball comprises a plurality of yarns arranged in parallel, and a tie is used for bundling the yarns at the middle section to form a ball structure. A fixing ring is threaded with the tie, and the threading rope is threaded through the fixing ring of each of the cleaning balls. The tie of each of the cleaning balls can be threaded with the threading rope in equal intervals beforehand, and the cleaning balls formed by bundling the side by side arranged yarns with the ties are arranged on the threading rope in equal intervals to form the cleaning structure. The yarns of the cleaning ball can be made of water repellent fiber yarn or water repellent reticulated yarn which can be spread as an expanded absorbing surface while floating on water surface, and the gaps of each of the fiber yarns are formed as spaces for absorbing floating oil and substance. The cleaning structure made of the water repellent material can be prevented from absorbing water and sinking. Thereby, floating oil and substance can be cleaned effectively.

5 Claims, 8 Drawing Sheets

CLEANING STRUCTURE FOR FLOATING OIL AND SUBSTANCE ON WATER SURFACE

BACKGROUND OF THE INVENTION

1. Field of Invention

The present invention relates to a cleaning structure with a water repellent cleaning member that can be prevented from absorbing water and sinking, and can be spread as an expanded absorbing surface while floating on water surface in order to clean floating oil and substance on water surface effectively.

2. Related Art

Floating substance or dirt on water surface does not sink because its specific weight is smaller than that of water. Floating substance will usually remain on water surface for a long time, which is not only awkward, but will also cause pollution and damage to the ecology. Therefore, it is an important environmental issue of how to clean floating substance on water surface.

Conventional cleaning structures for absorbing and cleaning floating oil and substance on water surface are usually structurally formed as cleaning members made of sponge material. Irregular holes inside the sponge are used for absorbing dirt floating on water surface.

SUMMARY OF THE INVENTION

However, even though the irregular spaces inside sponge material can absorb floating oil and substance on water surface, it will also absorb water easily. Once the sponge is fully soaked with water, it will sink easily and lose the effects of cleaning floating oil and substance. It is one of the disadvantages of sponge material.

Furthermore, once the sponge absorbed with dirt is sunk to the bottom of water, the polluted source will be extended from the water surface to under the water surface, which will be even more troublesome for cleaning afterwards. It is a second disadvantage of sponge material.

Therefore, the present invention aims to provide solutions for solving the disadvantages of the conventional floating dirt cleaning structures made of sponge material mentioned above; which are the problem of losing the effects of cleaning floating oil and substance because its is easy for the sponge to sink, and the troublesome for cleaning afterwards after the sponge is sunk into the water.

A primary objective of the present invention is to provide a cleaning structure for floating oil and substance on water surface which can be spread as an expanded absorbing surface while floating on water surface in order that floating oil and substance can be cleaned effectively.

A secondary objective of the present invention is to provide a cleaning structure for floating oil and substance on water surface which can be used repeatedly, prevented from absorbing water and sinking, and polluted substance can be prevented from extending downward from water surface to cause subsequent cleaning problems.

In order to achieve the above objectives, a cleaning structure for floating oil and substance on water surface of the present invention comprises at least one cleaning member which comprising a plurality of strands arranged in parallel, and a tie is used for bundling the strands at a middle section of the length of the strands to form the cleaning member, a fixing ring is threaded with the tie; and a threading rope extending through the fixing ring of each of the cleaning members so that the cleaning members can be pulled by the threading rope.

The tie of each of the cleaning members can be threaded with the threading rope in equal intervals beforehand, and the side by side arranged strands are set with an equal length. After the side by side arranged strands are bundled by using the tie, the cleaning structure is formed with the cleaning members arranged on the threading rope in equal intervals.

Another structure of the present invention comprises at least one cleaning member which comprising a plurality of strands arranged in parallel, vertical sewing threads are sewn on a middle section of the length of the strands and by two sides of the middle section in certain intervals (can be determined based on a size of area applied and requirements of application) in order to fix the strands together, the sewing thread at the middle section is coupled with at least one fixing ring; and a threading rope for threading the fixing ring of each of the cleaning members so that the cleaning member can be pulled by the threading rope.

The side by side arranged strands are flat structured water repellent fiber strands with a surface width, the length of the strands are determined based on a size of area applied and requirements of application.

The side by side arranged strands are reticulate structured water repellent strands formed by regularly connecting together a plurality of thin strands, the length of the strands are determined based on a size of area applied and requirements of application.

The present invention will become more fully understood by reference to the following detailed description thereof when read in conjunction with the attached drawings.

DETAILED DESCRIPTION OF THE INVENTION

Figure 1:
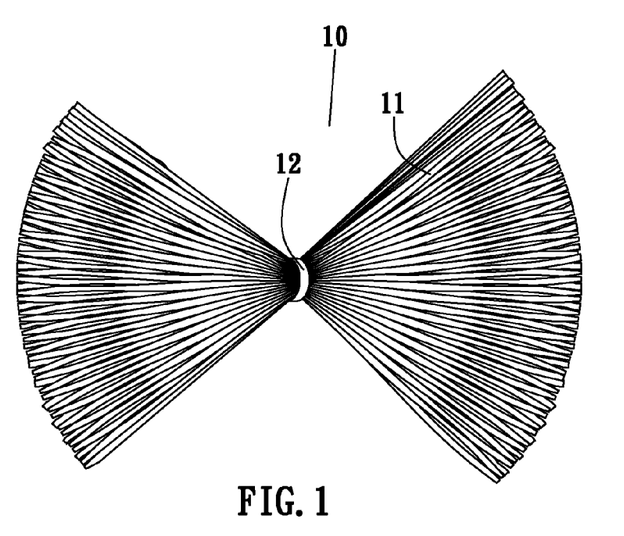
FIGS. 1 and 2 are structural views of a cleaning structure for floating oil and substance on water surface of the present invention.
Figure 2:
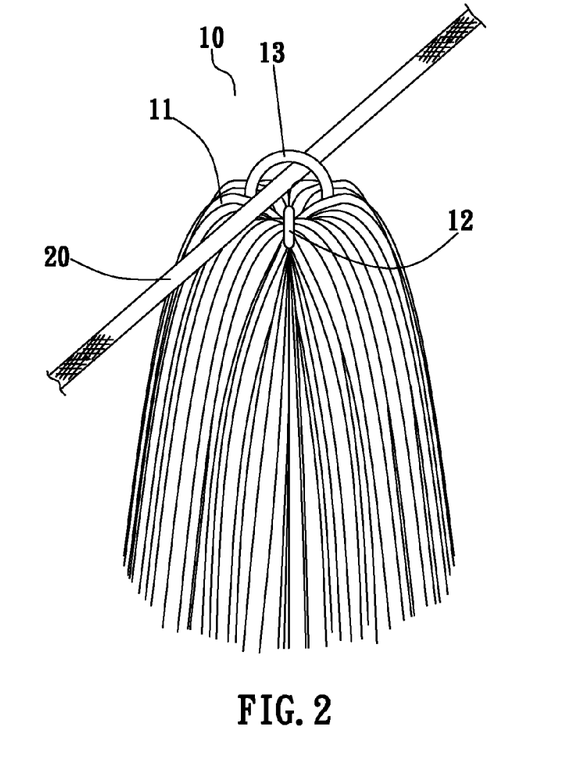

Please refer to FIGS. 1 and 2, which are structural views of a cleaning structure for floating oil and substance on water surface of the present invention. The cleaning structure for floating oil and substance on water surface comprises at least one cleaning member 10 composed by bundling strands and a threading rope 20.

The cleaning member 10 is formed by a plurality of flat structured water repellent fiber strands 11 with an equal length and a surface width, the water repellent fiber strands 11 are arranged side by side and a tie 12 is used for bundling the water repellent fiber strands 11 at the middle section of the length of the water repellent fiber strands 11 to form the cleaning member. As shown in FIG. 2, a fixing ring 13 is threaded with the tie 12.

As shown in FIG. 2, the threading rope 20 is threaded through the fixing ring 13 of each of the cleaning members 10 so that the cleaning members 10 can be pulled by the threading rope 20.

Figure 3:
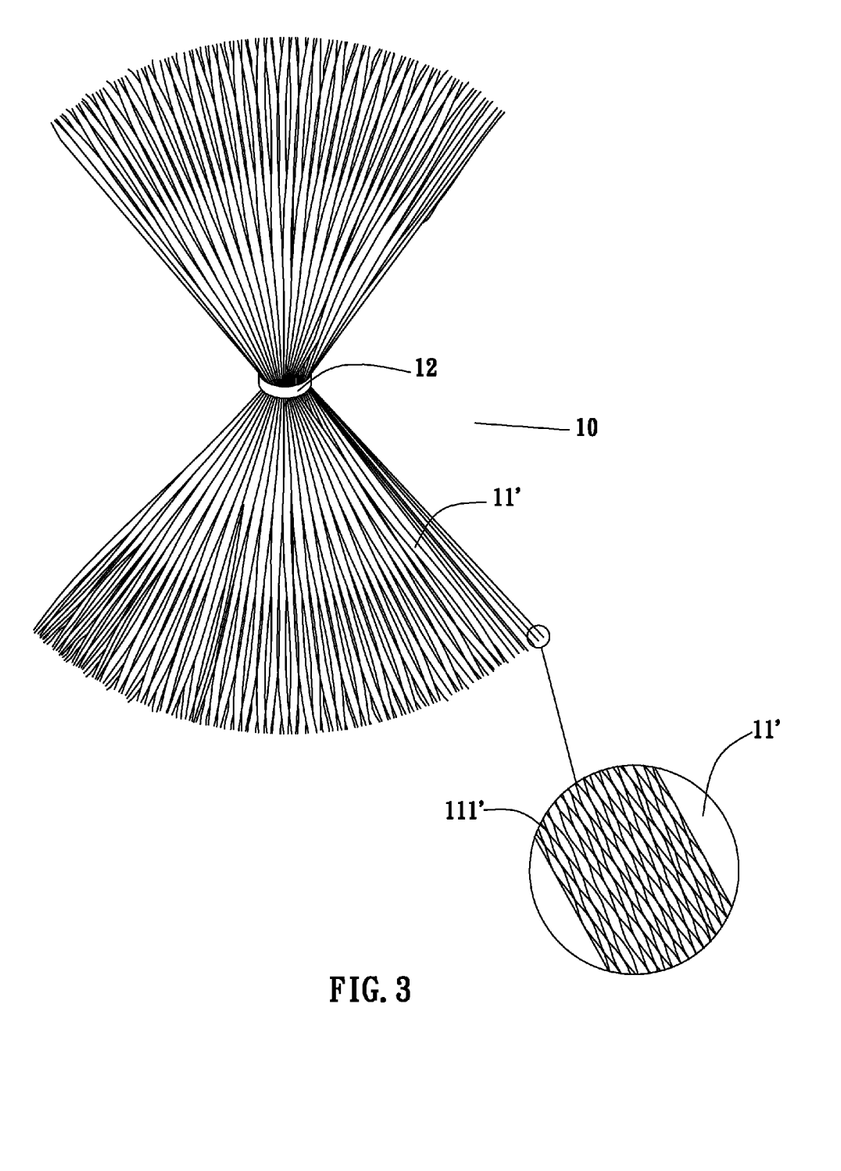
FIGS. 3 and 4 are structural views of the cleaning structure for floating oil and substance on water surface according to a second combination of the present invention.
Figure 4:
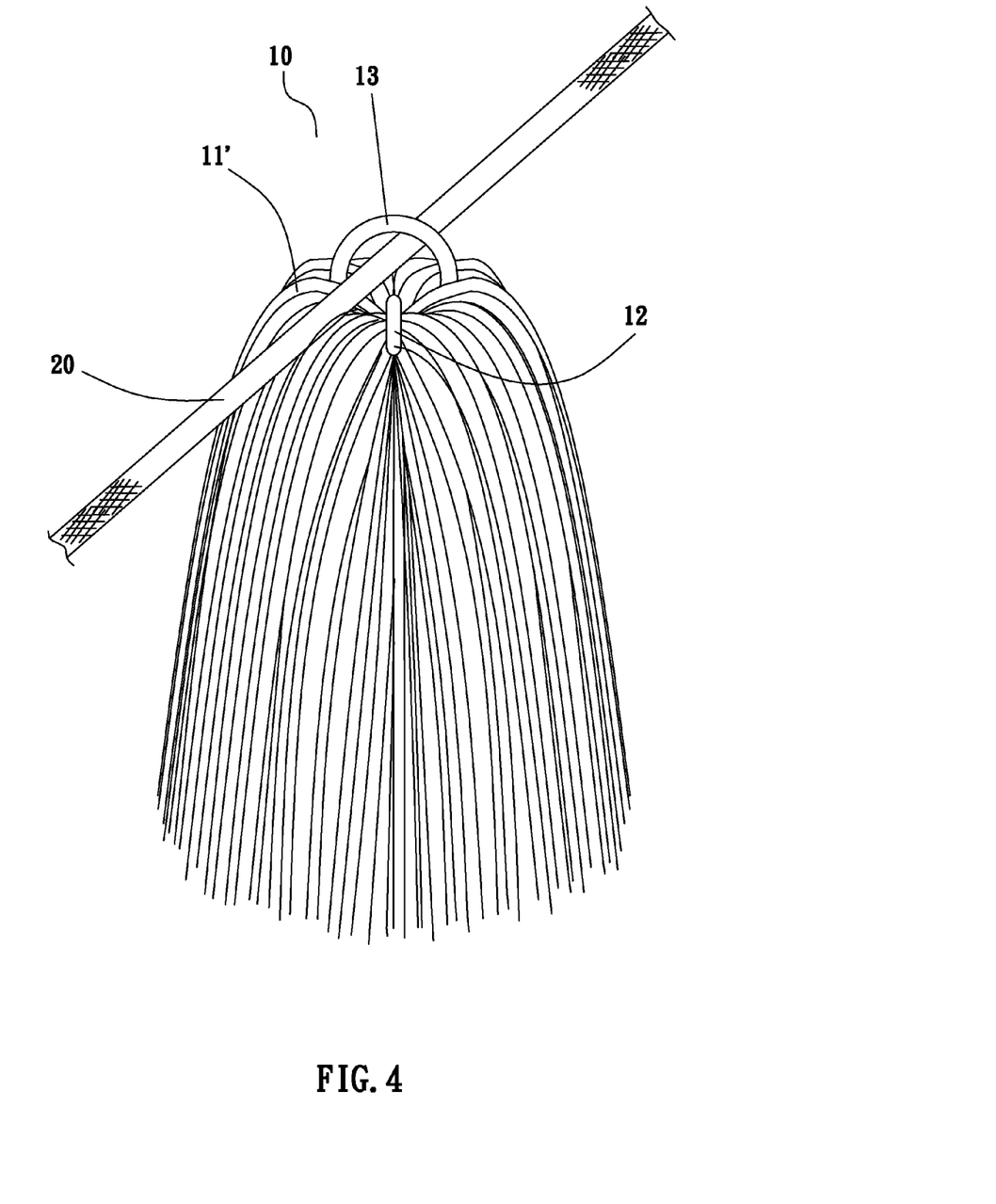

Please refer to FIGS. 3 and 4, which are structural views of the cleaning structure for floating oil and substance on water surface according to a second combination of the present invention. The cleaning member 10 comprises a plurality of reticulated water repellent strands 11' with an equal length formed by regularly connecting together a plurality of thin strands, the reticulated water repellent strands 11' are arranged side by side, and the tie 12 is used for bundling the reticulated water repellent strands 11' at the middle section of the length of the reticulated water repellent strands 11' to form the cleaning member. As shown in FIG. 4, the fixing ring 13 is threaded with the tie 12. The threading rope 20 is threaded through the fixing ring 13 of each of the cleaning members 10 so that the cleaning members 10 can be pulled by the threading rope 20.

Figure 5:
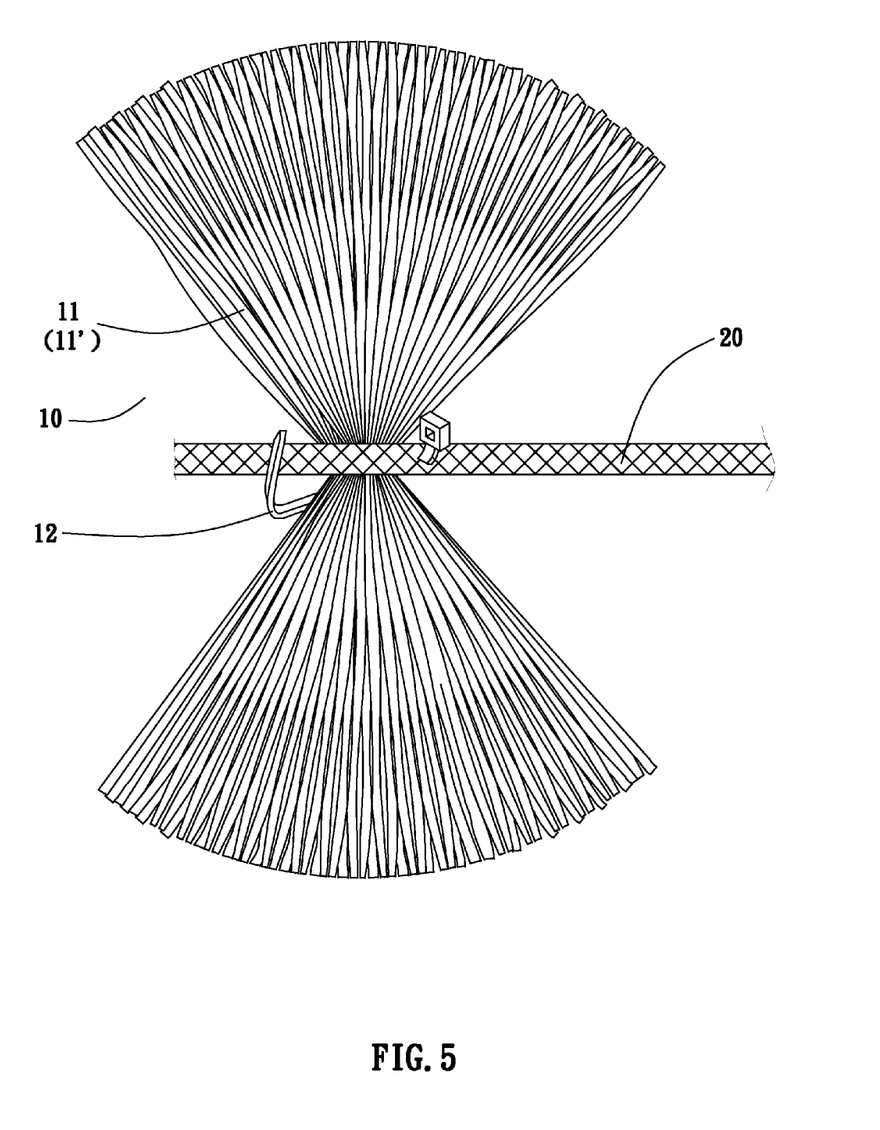
FIG. 5 is a structural view of the cleaning structure for floating oil and substance on water surface according to another combination of the present invention.

Please refer to FIG. 5, which is a structural view of the cleaning structure for floating oil and substance on water surface according to another combination of the present invention. The tie 12 of each of the cleaning members 10 can be threaded with the threading rope 20 in equal intervals beforehand, the cleaning members 10 are then formed by bundling the side by side arranged the water repellent fiber strands 11 or the reticulated water repellent strands 11' with the ties 12, and the cleaning members 10 are arranged on the threading rope 20 in equal intervals to form the cleaning structure which can be pulled by the threading rope 20, as shown in structures in FIGS. 6 and 7.

Figure 6:
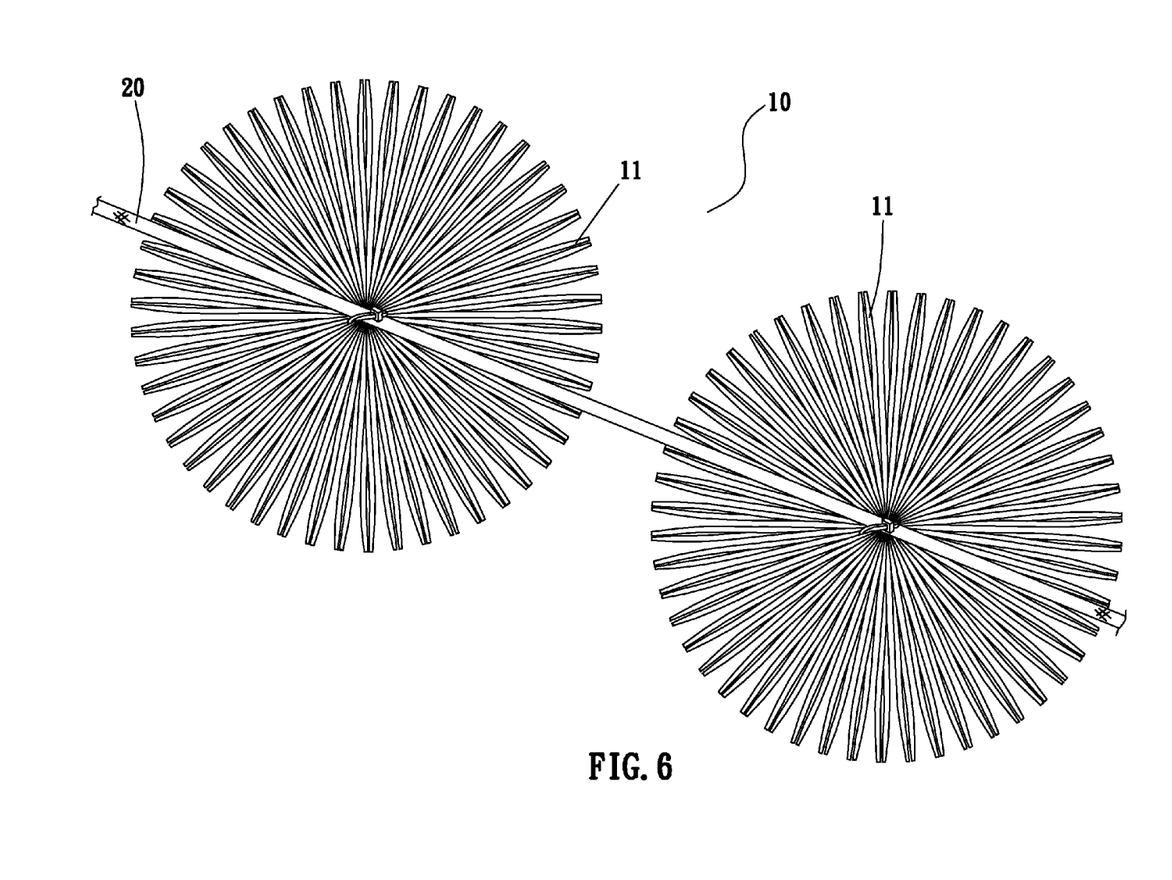
FIGS. 6 and 7 are flat views of the cleaning structure for floating oil and substance on water surface being used.
Figure 7:
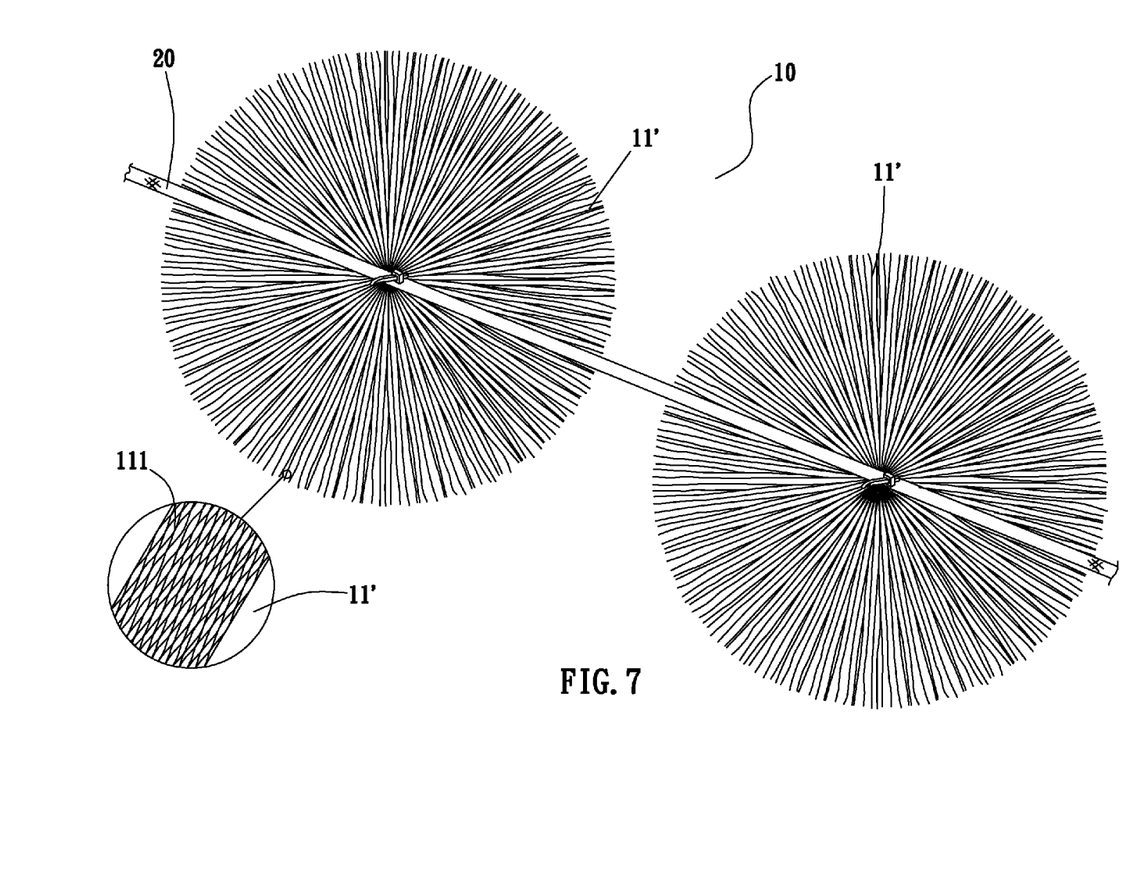

In the structure shown in FIG. 6, the cleaning members 10 composed of the water repellent fiber strands 11 can be spread as an expanded absorbing surface while floating on water surface, and gaps between of each of the water repellent fiber strands 11 are formed as spaces for absorbing floating oil and substance. The cleaning structure made of the water repellent material can be prevented from absorbing water and sinking. Thereby, floating oil and substance can be cleaned effectively. In the structure shown in FIG. 7, each of the reticulated water repellent strands 11' of the cleaning members 10 further comprises a plurality of thin strands 111', and reticulated gaps of the thin strands 111' are formed as spaces for absorbing floating oil and substance even more effectively.

Figure 8:
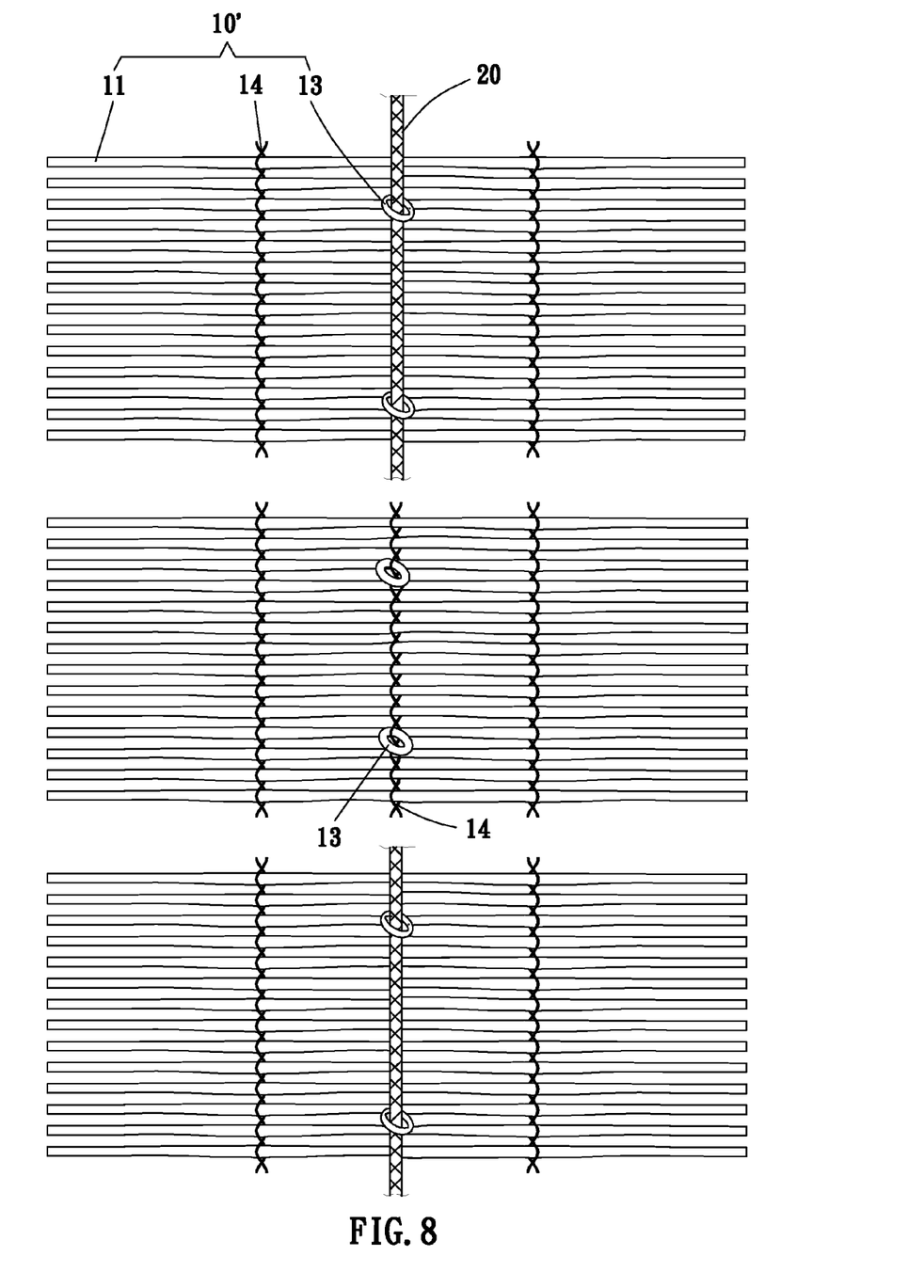
FIGS. 8 and 9 are structural views of the cleaning structure for floating oil and substance on water surface according to another embodiment of the present invention.
Figure 9:
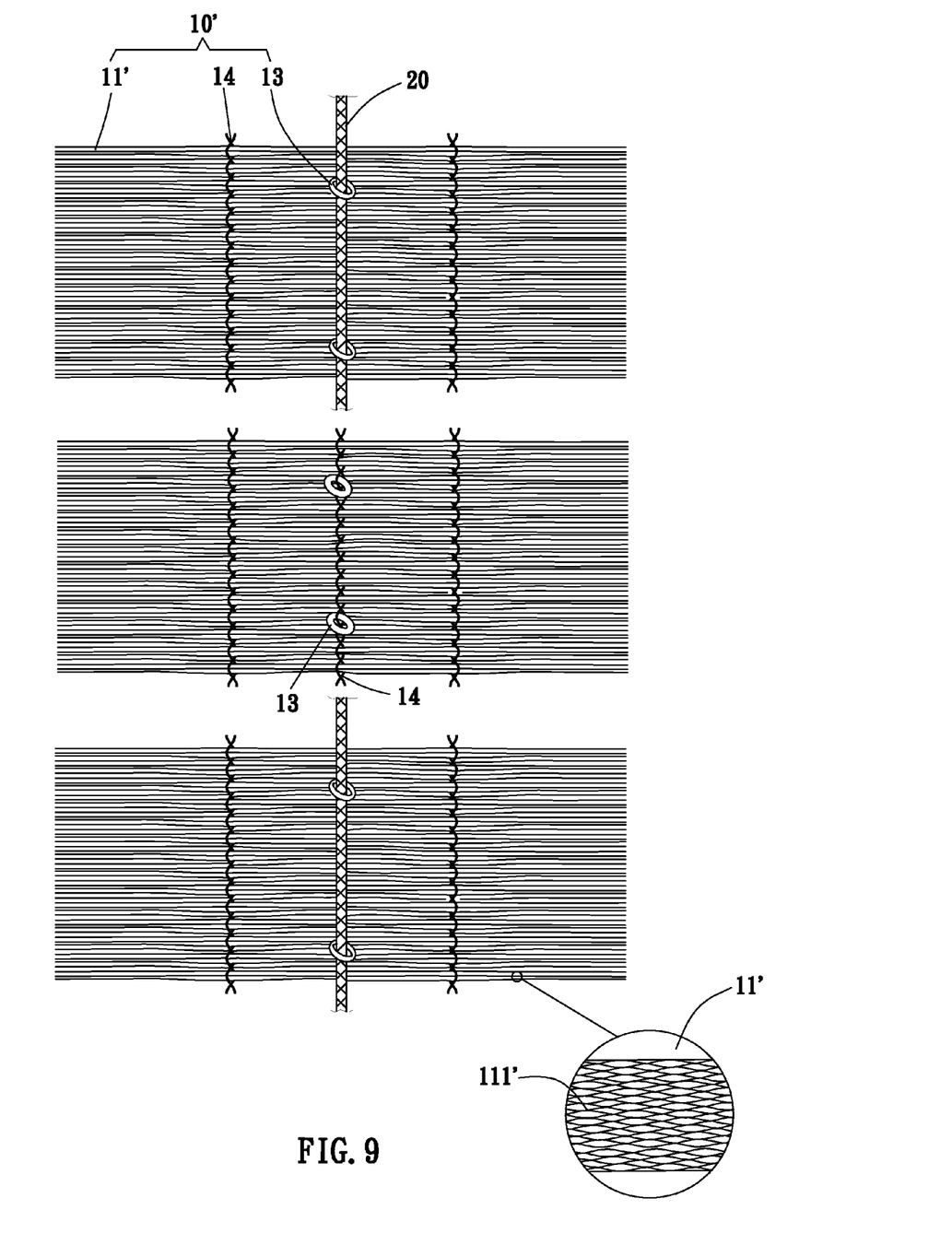

Please refer to FIGS. 8 and 9, which are structural views of the cleaning structure for floating oil and substance on water surface according to another embodiment of the present invention. In FIG. 8, the cleaning structure for floating oil and substance on water surface comprises at least one cleaning member 10' and the threading rope 20.

The cleaning member 10' comprises the side by side arranged water repellent fiber strands 11 with an equal length, vertical sewing threads 14 are sewn on a middle section of the length of the water repellent fiber strands 11 and by two sides of the middle section in certain intervals (can be determined based on a size of area applied and requirements of application) in order to fix the water repellent fiber strands 11 as the cleaning member 10'. The sewing thread 14 at the middle section is coupled with at least one of the fixing rings 13.

The threading rope 20 is threaded through the fixing rings 13 of each of the cleaning members 10' so that the cleaning members 10' can be pulled by the threading rope 20. The cleaning members 10' composed of the water repellent fiber strands 11 can be spread as a large absorbing surface while floating on water surface, and the gaps between each of the water repellent fiber strands 11 are formed as spaces for absorbing floating oil and substance.

As shown in FIG. 9, the cleaning member 10' comprises the side by side arranged reticulated water repellent strands 11' with an equal length, the vertical sewing threads 14 are sewn on the middle section of the length of the reticulated water repellent strands 11' and by the two sides of the middle section in certain intervals (can be determined based on a size of area applied and requirements of application) in order to fix the reticulated water repellent strands 11' as the cleaning member 10'. As shown in a partial enlarged view in FIG. 9, the reticulated spaces of each of the reticulated water repellent strands 11' formed by regularly connecting the thin strands 111' can absorb floating oil and substance even more effectively.

According to the cleaning structure for floating oil and substance on water surface of the present invention, the cleaning structure can be prevented from absorbing water and sinking by using the combinational structure of the water repellent strands, and polluted substance can be prevented from extending downward from water surface to cause subsequent cleaning problems.

Note that the specifications relating to the above embodiments should be construed as exemplary rather than as limitative of the present invention, with many variations and modifications being readily attainable by a person of average skill in the art without departing from the spirit or scope thereof as defined by the appended claims and their legal equivalents.

What is claimed is:

1. A cleaning structure for removing oil floating on a surface of a body of water, comprising: at least one cleaning member comprising a plurality of strands arranged side by side in parallel; a tie bundling together the strands at a middle section of a length of the strands to form the cleaning member; a fixing ring having an opening, wherein the tie extends through the opening of the fixing ring to couple the fixing ring to the cleaning member; and a threading rope extending through the opening of fixing ring of each of the cleaning members to enable pulling of the cleaning members over the surface of the body of the water.

2. A cleaning structure for removing oil floating on a surface of a body of water, comprising: at least one cleaning member comprising a plurality of strands arranged side by side in parallel; a tie bundling together the strands at a middle section of a length of the strands to form the cleaning member; a threading rope to enable pulling of the cleaning members over the surface of the body of water; wherein the tie of each of the cleaning members extends through a cross-section of the threading rope to secure the cleaning members to the threading rope, wherein the side by side arranged strands are set with an equal length, and wherein the cleaning members are arranged on the threading rope in equal intervals.

3. A cleaning structure for removing oil floating on a surface of a body of water, comprising: at least one cleaning member comprising a plurality of strands arranged in parallel, vertical sewing threads being sewn on a middle section of a length of the strands and on two sides of the middle section to fix the strands together; at least one fixing ring having an opening, wherein the sewing thread at the middle section extends through the opening of the at least one fixing ring to couple the fixing ring to the cleaning member; and a threading rope threaded through the opening of the at least one fixing ring of each of the cleaning members to enable pulling of the cleaning members over the surface of the body of water.

4. The cleaning structure for removing oil floating on a surface of a body of water as claimed in claim 1, 2 or 3, wherein the side by side arranged strands are flat structured water repellent fiber strands.

5. The cleaning structure for removing oil floating on a surface of a body of water as claimed in claim 1, 2 or 3, wherein the side by side arranged strands are reticulate structured water repellent strands formed by regularly connecting together a plurality of thin, strands.

* * * * *